United States Patent [19]

Vinegar et al.

[11] Patent Number: 4,635,197
[45] Date of Patent: Jan. 6, 1987

[54] HIGH RESOLUTION TOMOGRAPHIC IMAGING METHOD

[75] Inventors: Harold J. Vinegar; Scott L. Wellington, both of Houston, Tex.

[73] Assignee: Shell Oil Company, Houston, Tex.

[21] Appl. No.: 566,619

[22] Filed: Dec. 29, 1983

[51] Int. Cl.⁴ .................... G06F 15/42; G01N 23/00; G01T 1/20

[52] U.S. Cl. ....................................... 364/414; 378/4; 250/361 R

[58] Field of Search ............... 364/414, 577, 723, 853; 378/901, 11, 14, 4; 250/361 R

[56] References Cited

U.S. PATENT DOCUMENTS

| | | | |
|---|---|---|---|
| 3,983,399 | 9/1976 | Cox, Jr. et al. | 364/414 X |
| 4,008,400 | 2/1977 | Brunnett et al. | 364/414 |
| 4,071,769 | 1/1978 | Brunnett et al. | 378/4 |
| 4,158,142 | 6/1979 | Haimson | 378/10 |
| 4,173,720 | 11/1979 | Cteluk | 364/414 |
| 4,229,651 | 10/1980 | Danos | 376/6 |
| 4,398,092 | 8/1983 | Carlson | 250/361 R |
| 4,433,380 | 2/1984 | Abele et al. | 364/414 |
| 4,549,265 | 10/1985 | Deckers et al. | 364/414 |

Primary Examiner—Jerry Smith
Assistant Examiner—Jon D. Grossman

[57] ABSTRACT

A method for use with a computerized axial tomographic scanner (CAT) of providing an image of a sample that has spatial resolution in the axial direction that is smaller than the width of the X-ray beam of the CAT. The sample is scanned at a plurality of points in a plurality of cross sections that are separated by a distance that is less than the width of the X-ray beam of the CAT to determine the measured density function for each of the plurality of points. The measured density function is deconvolved with the beam width function for the CAT for each of the plurality of points to obtain the actual density function for the plurality of points. The actual density function is then used to generate an image of the sample that has a spatial resolution in the axial direction that is smaller than the width of the X-ray beam of the CAT.

13 Claims, 7 Drawing Figures

HIGH RESOLUTION TOMOGRAPHIC IMAGING METHOD

BACKGROUND OF THE INVENTION

This invention relates to computerized axial tomographic analysis.

SUMMARY OF THE INVENTION

In accordance with the present invention there is provided a method for use with a computerized axial tomographic scanner (hereinafter referred to as "CAT") of providing an image of a sample that has spatial resolution in the axial direction that is smaller than the width of the X-ray beam of the CAT. The sample is scanned at a plurality of points in a plurality of cross sections that are separated by a distance that is less than the width of the X-ray beam of the CAT to determine the measured density function for each of the plurality of points. The measured density function is deconvolved with the beam width function for the CAT for each of the plurality of points to obtain the actual density function for the plurality of points. The actual density function is then used to generate an image of the sample that has a spatial resolution in the axial direction that is smaller than the width of the X-ray beam of the CAT. Preferably, the scans are separated by a distance that is on the order of the resolution desired in the axial direction of the image of the sample. The deconvolving step can be implemented by determining the Fourier transform for the actual density function from the Fourier transforms for the measured density function and the normalized beam width function for the CAT and performing an inverse Fourier transform on the determined Fourier transform for the actual density function. This process is performed for each point or pixel in the cross section. Alternatively, other techniques can be utilized such as fast Fourier transforms, Laplace transforms and the like. In addition, multiple scans can be taken at each location and averaged to improve the ultimate resolution obtainable in the axial direction.

Other objectives, advantages and applications of the present invention will be made apparent by the following detailed description of the preferred embodiments of the present invention.

DETAILED DESCRIPTION OF THE PREFERRED EMBODIMENTS

Figure 1:
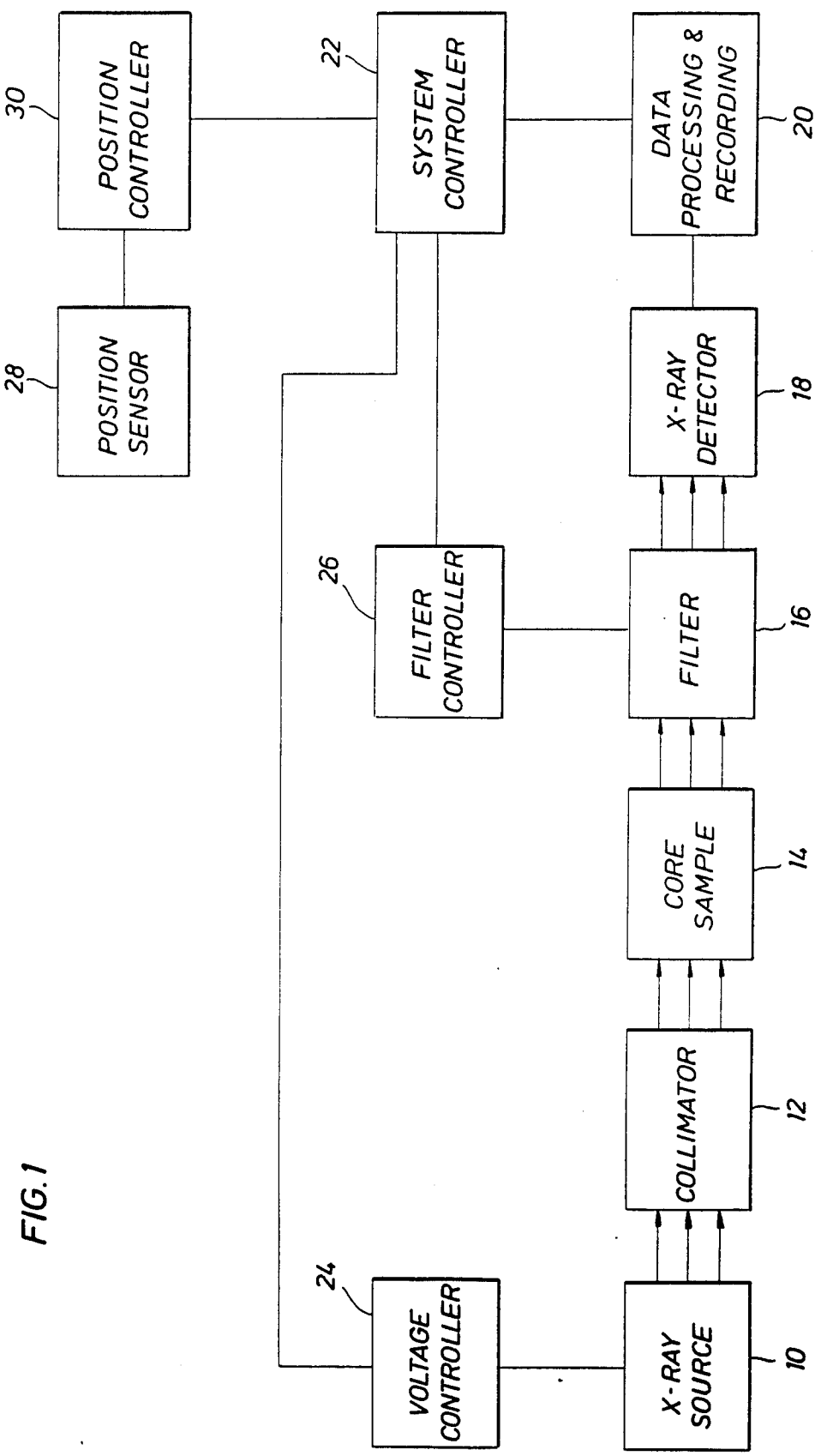
FIG. 1 is a block diagram of a computerized axial tomographic analyzer suitable for use in the method of the present invention.
Figure 2:
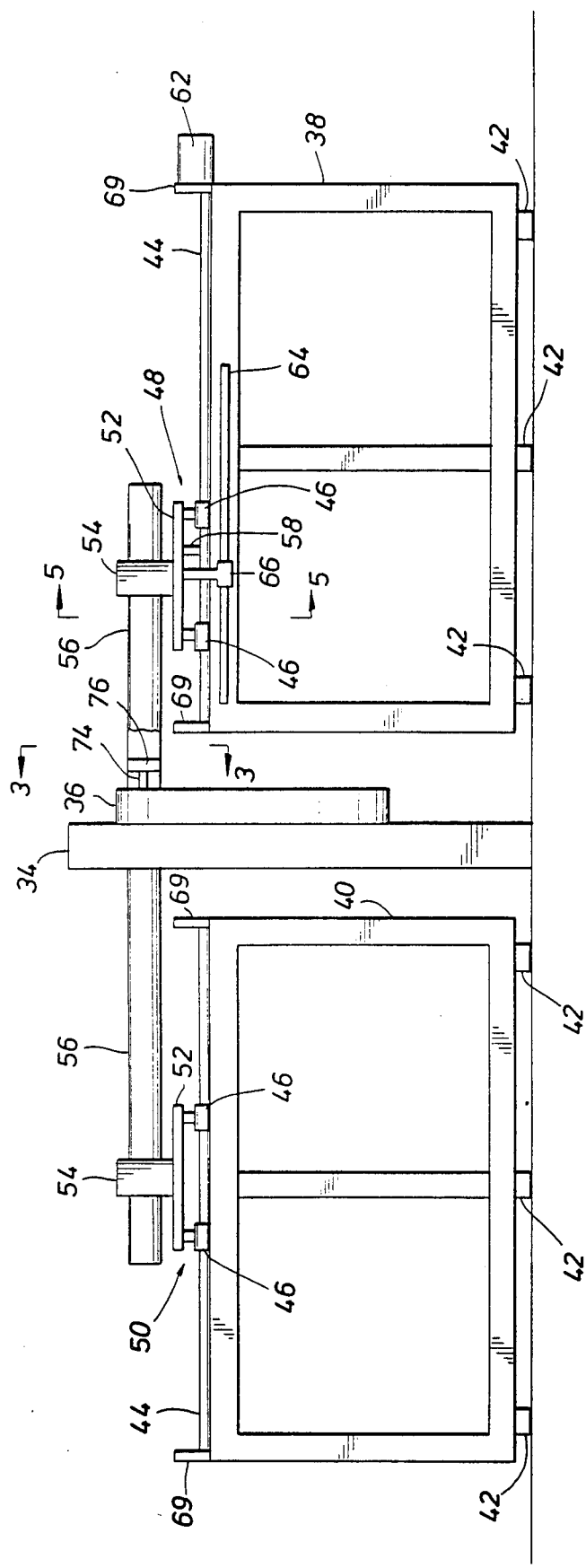
FIG. 2 is a side view of the sample holding apparatus employed with the computerized axial tomographic analyzer.
Figure 3:
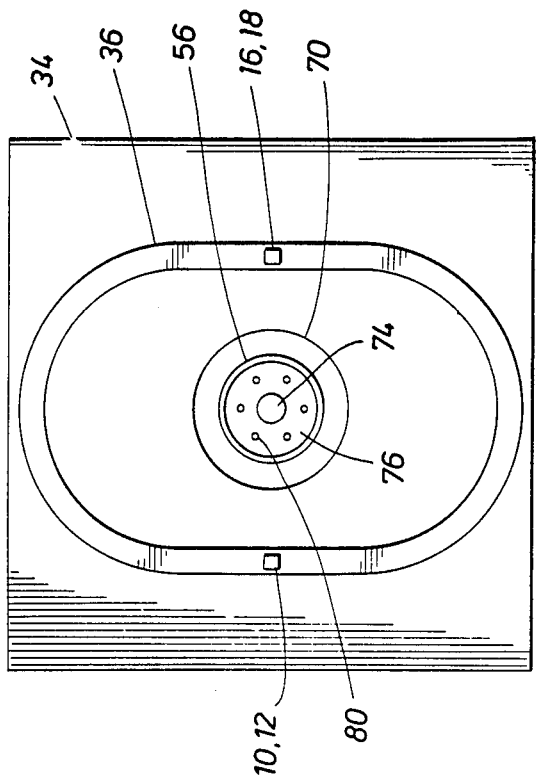
FIG. 3 is a cross sectional view taken along lines 3—3 of FIG. 2.
Figure 4:
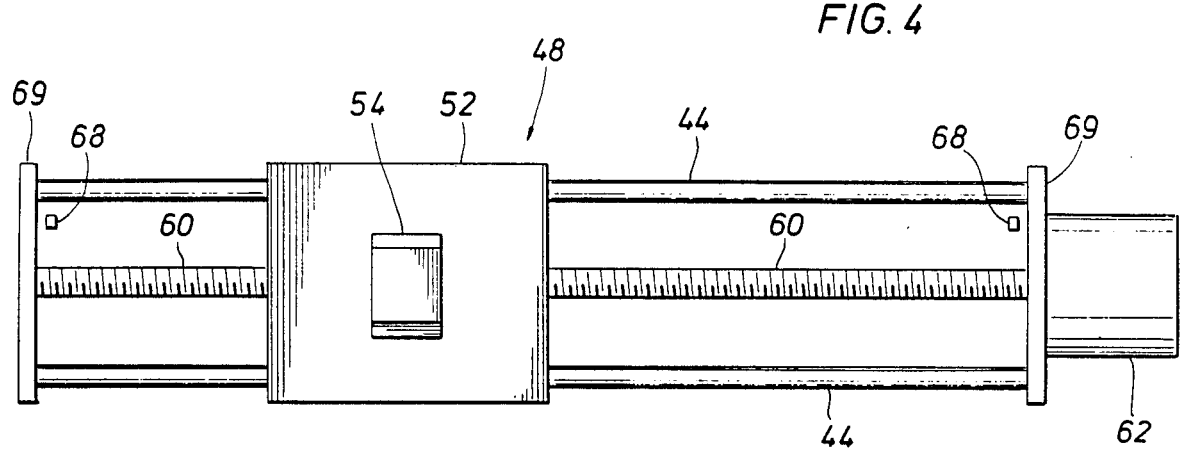
FIG. 4 is a top view of the motorized side of the sample holding apparatus.
Figure 5:
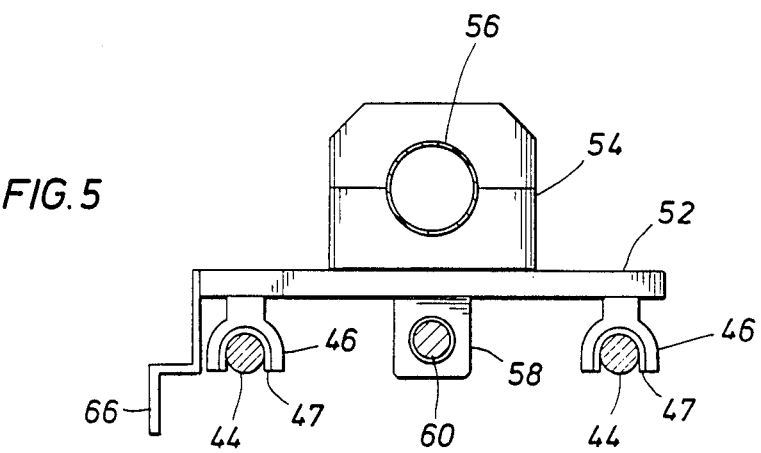
FIG. 5 is a cross sectional view taken along lines 5—5 of FIG. 2.
Figure 6:
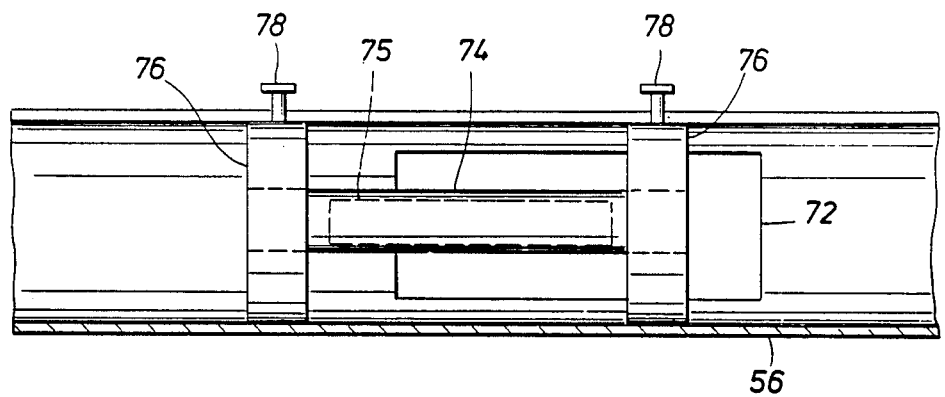
FIG. 6 is a side view of the tube and cylinder portion of the sample holding apparatus.

Referring to FIG. 1, a typical CAT suitable for use in the method of the present invention employs an X-ray source 10 to provide X-rays which are indicated by a plurality of arrows; these X-rays are collimated by collimator 12 prior to passing through core sample 14. After the X-rays have passed through core sample 14, they are filtered by filter 16 which can be, for example, air, tungsten or copper. Alternatively, filter 16 can be applied to the X-rays prior to their entering core sample 14 rather than after their passage through core sample 14. The filtered X-rays are then detected by X-ray detectors 18 which generate signals indicative thereof; these signals are provided to suitable data processing and recording equipment 20. The entire operation, from the generation of the X-rays to the processing of the data is under the control of system controller 22. Suitable signals are provided by system controller 22 to voltage controller 24 which controls the voltage applied to X-ray source 10, thereby controlling the energy range of the X-rays. Alternatively, filter 16 can be used to vary the energy range as is known in the art. System controller 22 also provides suitable control signals to filter controller 26 to apply the appropriate filter to the X-rays which have passed through core sample 14 before they are detected by X-ray detector 18. The point along core sample 14 that is being analyzed is detected by sample position sensor 28 which provides signals indicative thereof to sample position controller 30. System controller 22 provides signals which are indicative of the desired point along core sample 14 or the amount of advancement from the last point analyzed, to sample position controller 30, which moves core sample 14 to the proper location.

Referring now to FIGS. 2-6, a suitable CAT and sample positioning system for use in the present invention is shown in detail. A typical CAT, for example, the Deltascan-100 manufactured by Technicare Corporation of Cleveland, Ohio is indicated by numeral 34. Cat 34 has a gantry 36 which contains X-ray source 10, collimator 12, filter 16 and X-ray detectors 18. Support structures or tables 38 and 40 are located on opposite sides of CAT 34 and have legs 42 which are suitably attached to, for example, the floor, to ensure that tables 38 and 40 maintain proper positioning and alignment with CAT 34. Tables 38 and 40 each have a set of guide means or rails 44, such as one inch diameter solid 60 case shafts mounted on shaft supports, Model No. Sr-16, both being manufactured by Thomson Industries, Inc. of Manhasset, N.Y., on which the legs 46 of trolleys 48 and 50 ride. Preferably, legs 46 have a contact portion 47 that includes ball bearings in a nylon enclosure, such as the Ball Bushing Pillow Block, Model No. PBO-16-OPN, which are also manufactured by Thomson. Trolleys 48 and 50 have a flat member 52 which is attached to legs 46 such that member 52 is parallel to rails 44. A member 54 which can consist of two pieces fastened together by suitable means, such as screws, is mounted on member 52 and has an aperture suitable for holding tube 56. Member 52 of trolley 48 has a member 58 attached to the bottom portion of member 52 that is provided with suitable screw threads for mating with gear or screw 60. Screw 60 is driven by motor 62 for moving trolley 48 horizontally. Screw 60 can be, for example, a preloaded ball bearing screw, Model No. R-0705-72-F-W, manufactured by Warner Electric Brake & Clutch Company of Beloit, Wis., and motor 62 can be, for example, a DC motor, Model No. 1165-01DCMO/E1000MB/X2, marketed by Aerotech, Inc. of Pittsburgh, Pa. Motor 62 turns a predetermined number of degrees of revolution in response to a signal from sample position controller 30 of FIG. 1, which can be, for example, a Unidex Drive, Model No. SA/SL/C/W/6020/DC-O/F/BR/R*, which is also marketed by Aerotech. Table 38 and trolley 48 also contain an optical encoding position sensing system, for example, the Acu-Rite-II manufactured by Bausch and Lomb Company of Rochester, N.Y., which comprises a fixed ruler or scale 64 attached to table 38 and an eye or sensor 66 attached to member 52 of trolley 48 for determining the position along ruler 64 at which trolley 48 is located. The digital output from optical sensor 66 is provided to sample position controller 30 of FIG. 1 so that sample position controller 30 can compare this with the desired position indicated by the digital signal from system controller 22 and provide appropriate control signals to motor 62 for rotation of screw 60 to accurately position trolley 48. Table 38 can also be provided with limit switches 68 which provide appropriate control signals to sample position controller 30 which limits the length of travel of trolley 48 from hitting stops 69 on table 38.

Tube 56 is centered in the X-ray field 70 of CAT 34. The attachment of tube 56 to members 54 of trolley 48 and 50 by a screw or other suitable fastening means causes trolley 50 to move when trolley 48 is moved by means of screw 60 and motor 62. Tube 56 which preferably is made of material that is optically transparent and mechanically strong and has a low X-ray absorption, for example, plexiglas, has a removable window 72 to facilitate the positioning of sample holder 74 in tube 56. A core sample 75 is positioned in sample holder 74 as indicated by dotted lines. The ends of sample holder 74 are positioned in central apertures of discs 76, which can be made of a low friction material, for example, nylon, and are sized such that they make a close sliding fit to ensure centering of the sample inside tube 56. Discs 76 are locked in position in tube 56 by screws 78 which can be made of, for example, nylon. In addition, discs 76 can be provided with a plurality of apertures 80 sized to accommodate fluid lines and electrical power lines from various equipment associated with sample holder 74.

Sample holder 74 can be a pressure-preserving, core-sample container used in normal coring operations; however, if standard X-ray energy associated with CAT scan analytic equipment, such as the Deltascan-100 mentioned hereinabove, the pressure vessel must be made of material that will allow the X-rays to pass through the container walls, for example aluminum, beryllium or alumina. Aluminum is preferred because it absorbs a portion of the low energy spectra, thus making the beam more monochromatic. Nevertheless, steel pressure containers can be employed if higher energy X-ray tubes or radioactive sources are used. In the case of a frozen core sample the container can be positioned inside an insulating cylinder which can be made of, for example, styrofoam or other insulating materials with low X-ray absorption. This insulating cylinder can be filled with dry ice or the like to keep the core sample frozen. If it is desired to heat a core sample, a heating element which has a low X-ray absorption, such as the heating foil manufactured by Minco Products, Inc. of Minneapolis, Minn., can be wrapped around the container to heat the sample and a similar insulating cylinder can be used. Alternatively, sample holder 74 can be replaced by an unpressurized or unsealed container which is suitable for holding a core sample or other material in a fixed position.

As discussed hereinabove, tables 38 and 40 have legs 42 which are suitably attached to, for example, the floor, to ensure that tables 38 and 40 maintain proper alignment with CAT 34. This alignment is originally obtained by mounting optical cross hairs in the center of each side of the aperture of X-ray field 70 and mounting identical cross hairs in the center of each member 54. An optical transit is set up and legs 42 are adjusted so that all cross hairs are on line when trollies 48 and 50 are at either end of tables 38 and 40. When proper alignment is obtained legs 42 are locked in place.

Figure 7:
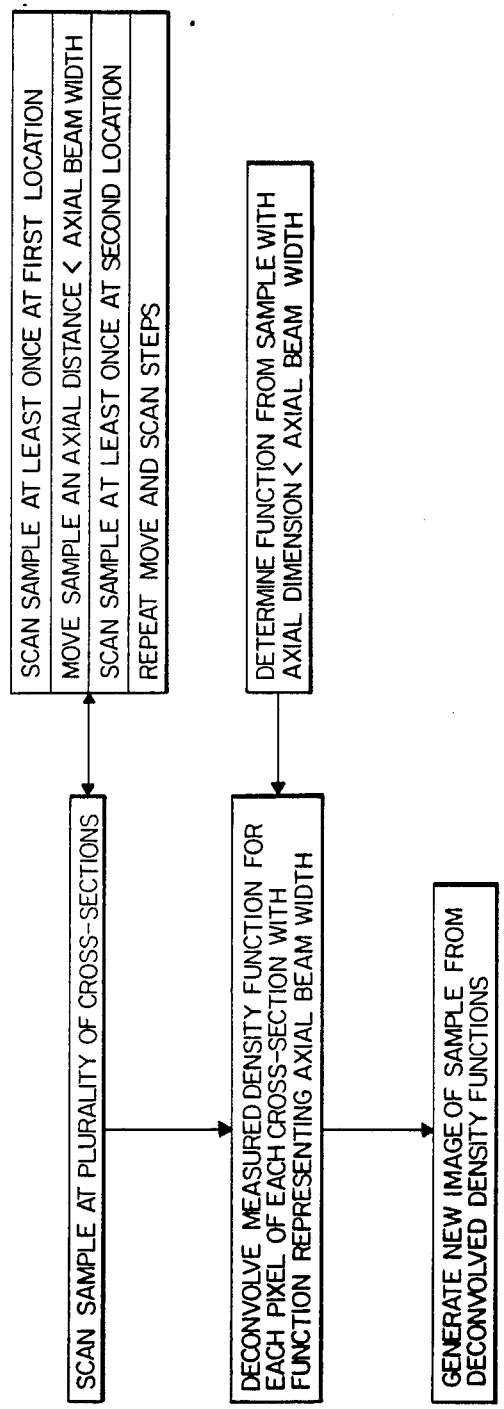
FIG. 7 is a flow chart depicting the method of the present invention.

In the method of the present invention as depicted in FIG. 7 an image of the core sample is provided that has spatial resolution in the axial direction that is smaller than the width of the X-ray beam of the CAT. Core sample 75 is scanned by CAT 34 at a plurality of cross sections. Preferably, the scans are separated by a distance that is on the order of the resolution desired in the axial direction of the image of core sample 75. This is accomplished by scanning core sample 75 at a first location and moving trolley 48 so that core sample 75 is scanned at a second location that is separated from the first location by the desired distance. This is repeated for a plurality of cross sections along the axial direction of core sample 75. A longitudinal reconstruction, which is a line of pixels along the axial direction at a particular horizontal and vertical location, is performed by system controller 22 and data processing and recording 20, as is known in the art, from the plurality of cross-sectional images. This longitudinal reconstruction, referred to hereinafter as the "measured density function," is performed for each of the plurality of points or pixels in the cross section. The measured density function is deconvolved with the normalized beam width function for CAT 34 by system controller 22 and data processing and recording 20 for each of the points or pixels to obtain the actual density function for each of the plurality of pixels. If the normalized beam width function is not known, it can be determined, for example, by scanning a thin, homogeneous sheet of material while advancing the table and normalizing the measurements so that $$\int_{-\infty}^{\infty} g(z)dz = 1 \qquad (1)$$

where g(z) is the normalized beam width function. For example, the beam width function for the Deltascan-100 discussed hereinabove is well-approximated by a Gaussian of eight millimeters full width at half maximum, that is, $$g(z) = \frac{1}{\sigma\sqrt{2\pi}} \exp\left(\frac{-z^2}{2\sigma^2}\right) \qquad (2)$$

for which the full width at half maximum is $2.36\sigma$. Thus, $$\sigma = (8 \text{ mm}/2.36) = 3.39 \text{ mm} \qquad (3)$$

The deconvolving step can be implemented by determining the Fourier transform for the actual density function from the Fourier transform for the measured density function and the Fourier transform for the normalized beam width function for the CAT and performing an inverse Fourier transform for the actual density function. This process is performed for each point or pixel in the cross section. The measured density function, C(z), is approximately equivalent to a convolution of the actual density function, $\rho(z)$, of the core sample with the beam width function, g(z), of the CAT and can be expressed as follows:

$$C(z) = \int_{-\infty}^{\infty} \rho(s) g(z - s) ds \quad (4)$$

The Fourier transforms are defined as follows:

$$C^*(\omega) = \int_{-\infty}^{\infty} e^{-i\omega z} C(z) dz \quad (5)$$

$$\rho^*(\omega) = \int_{-\infty}^{\infty} e^{-i\omega z} \rho(z) dz \quad (6)$$

$$g^*(\omega) = \int_{-\infty}^{\infty} e^{-i\omega z} g(z) dz \quad (7)$$

$C^*(\omega)$ and $g^*(\omega)$ are computed and the convolution theorem for Fourier transforms is used so that $\rho^*(\omega)$ is determined as follows:

$$\rho^*(\omega) = \frac{C^*(\omega)}{g^*(\omega)} \quad (8)$$

The actual density function is obtained by performing an inverse Fourier transform on $\rho^*(\omega)$ as follows:

$$\rho(z) = \frac{1}{2\pi} \int_{-\infty}^{\infty} e^{i\omega z} \rho^*(\omega) d\omega \quad (9)$$

The steps for determining $\rho^*(\omega)$ and $\rho(z)$ according to equations (8) and (9) are repeated for each longitudinal line through the image for each point or pixel in the cross section. The CAT system controller and data processing system can be used to generate an image of any longitudinal plane in the sample from the determined $\rho(z)$.

The Fourier transforms employed as described above can be replaced by other suitable techniques, for example, fast Fourier transforms, Laplace transforms and the like. In addition, multiple scans can be taken at each location and averaged to improve the ultimate resolution obtainable in the axial direction.

It should be noted that throughout the discussion reference has been made to a core sample from a borehole; however, this reference is merely exemplary and is not intended as a limitation of the utilization of the method of the present invention. Rather, any material can be imaged according to the method set forth herein.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method for increased spatial resolution in the axial direction of a computerized axial tomographic scanner (CAT), said method comprising the steps of: scanning said sample at a plurality of cross sections that are separated by a distance that is less than an axial width of the beam of said CAT to determine measured density functions for a plurality of pixels in each of said plurality of cross sections; deconvolving the measured density functions for each of said plurality of pixels with a function representing said beam width for said CAT to obtain the actual density function for said plurality of pixels; using said actual density function to generate an image of said sample that has a spatial resolution in the axial direction that is smaller than the width of said beam of said CAT.

2. A method as recited in claim 1, wherein said scanning step comprises scanning said sample at a plurality of cross sections that are separated by a distance that is approximately equal to a distance of the order of a preselected spatial resolution in the axial direction of the image of said sample.

3. A method as recited in claim 1, wherein said scanning step comprises scanning each cross section a plurality of times.

4. A method as recited in claim 1, wherein said deconvolving step comprises determining a Fourier transform for the actual density function for said plurality of pixels from a Fourier transform for the measured density function for said plurality of pixels and a Fourier transform for said function representing the beam width for said CAT and determining the actual density function for said plurality of pixels by performing an inverse Fourier transform on said determined Fourier transform for the actual density function for said plurality of pixels.

5. A method as recited in claim 1, wherein said method further comprises the step of determining a normalized function representing said beam width for said CAT.

6. A method as recited in claim 5, wherein said step of determining the normalized function representing said beam width comprises the steps of scanning at a first location a first sample which has an axial dimension that is less than the axial width of the beam of said CAT, moving said first sample by a distance that is less than the axial width of the beam of said CAT to a second location and scanning said first sample at said second location.

7. A method as recited in claim 2, wherein said scanning step comprises scanning each cross section a plurality of times.

8. A method as recited in claim 2, wherein said deconvolving step comprises determining a Fourier transform for the actual density function for said plurality of pixels from a Fourier transform for the measured density function for said plurality of pixels and a Fourier transform for said function representing the beam width for said CAT and determining the actual density function for said plurality of pixels by performing an inverse Fourier transform on said determined Fourier transform for the actual density function for said plurality of pixels.

9. A method as recited in claim 7, wherein said deconvolving step comprises determining a Fourier transform for the actual density function for said plurality of pixels from a Fourier transform for the measured density function for said plurality of pixels and a Fourier transform for said function representing the beam width for said CAT and determining the actual density function for said plurality of pixels by performing an inverse Fourier transform on said determined Fourier transform for the actual density function for said plurality of pixels.

10. A method as recited in claim 2, wherein said method further comprises the step of determining a normalized function representing said beam width for said CAT.

11. A method as recited in claim 10, wherein said step of determining the normalized function representing said beam width comprises the steps of scanning at a first location a first sample which has an axial dimension that is less than the axial width of the beam of said CAT, moving said first sample by a distance that is less than the axial width of the beam of said CAT to a second location and scanning said first sample at said second location.

12. A method as recited in claim 7, wherein said method further comprises the step of determining a normalized function representing said beam width for said CAT.

13. A method as recited in claim 12, wherein said step of determining the normalized function representing said beam width comprises the steps of scanning at a first location a first sample which has an axial dimension that is less than the axial width of the beam of said CAT, moving said first sample by a distance that is less than the axial width of the beam of said CAT to a second location, and scanning said first sample at said second location.

* * * * *